(12) United States Patent
Ino et al.

(10) Patent No.: US 7,993,965 B2
(45) Date of Patent: Aug. 9, 2011

(54) PROCESS FOR PRODUCING SEMICONDUCTIVE PORCELAIN COMPOSITION/ELECTRODE ASSEMBLY

(75) Inventors: Kentaro Ino, Osaka (JP); Takeshi Shimada, Osaka (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/920,377

(22) PCT Filed: Mar. 12, 2009

(86) PCT No.: PCT/JP2009/054810
§ 371 (c)(1),
(2), (4) Date: Aug. 31, 2010

(87) PCT Pub. No.: WO2009/119335
PCT Pub. Date: Oct. 1, 2009

(65) Prior Publication Data
US 2011/0039369 A1    Feb. 17, 2011

(30) Foreign Application Priority Data

Mar. 27, 2008 (JP) .................................. 2008-082669

(51) Int. Cl.
*H01L 21/00* (2006.01)
(52) U.S. Cl. ........................................................ 438/104
(58) Field of Classification Search ................... 438/104
See application file for complete search history.

(56) References Cited

U.S. PATENT DOCUMENTS

| | | | | |
|---|---|---|---|---|
| 4,728,779 A | * | 3/1988 | Kotani et al. ................. | 219/517 |
| 4,874,924 A | * | 10/1989 | Yamamoto et al. ............ | 392/395 |
| 5,337,038 A | * | 8/1994 | Taniguchi et al. ........... | 338/22 R |
| 6,163,246 A | * | 12/2000 | Ueda et al. ................... | 338/331 |
| 2009/0057626 A1 | * | 3/2009 | Shimada et al. ......... | 252/520.21 |
| 2009/0233785 A1 | * | 9/2009 | Shimada et al. ............. | 501/139 |

FOREIGN PATENT DOCUMENTS

| | | |
|---|---|---|
| JP | 56-169301 | 12/1981 |
| JP | 2004-134744 | 4/2004 |
| JP | 2005-255493 | 9/2005 |
| WO | WO 2006/118274 | 11/2006 |
| WO | WO 2008/050876 | 5/2008 |

OTHER PUBLICATIONS

U.S. Appl. No. 12/810,336, filed Jun. 2010, Shimada.
U.S. Appl. No. 12/810,336 filed Jun. 24, 2010, Takeshi Shimada, Hitachi Metals, Ltd.
Search Report issued in International Application No. PCT/JP2009/054810 on Jun. 16, 2009.

* cited by examiner

*Primary Examiner* — Thao P. Le
(74) *Attorney, Agent, or Firm* — Stein McEwen, LLP

(57) ABSTRACT

A semiconductive porcelain composition/electrode assembly which is low in room temperature resistivity of 100 Ω·cm or less and is reduced in change with the passage of time due to energization with regard to the semiconductive porcelain composition in which a part of Ba of $BaTiO_3$ is substituted with Bi—Na and which has a P-type semiconductive component at a crystal grain boundary. Also, there is a process for producing a semiconductive porcelain composition/electrode assembly wherein an electrode is joined to a semiconductive porcelain composition in which a part of Ba of $BaTiO_3$ is substituted with Bi—Na and which has a P-type semiconductive component at a crystal grain boundary, the process including joining the electrode to the semiconductive porcelain composition, followed by conducting a heat treatment at a temperature of from 100° C. to 600° C. for 0.5 hour to 24 hours.

3 Claims, 2 Drawing Sheets

PROCESS FOR PRODUCING SEMICONDUCTIVE PORCELAIN COMPOSITION/ELECTRODE ASSEMBLY

CROSS-REFERENCE TO RELATED APPLICATIONS

This application claims the benefit of PCT International Patent Application No. PCT/JP2009/054810, filed Mar. 12, 2009, and Japanese Patent Application No. 2008-082669, filed Mar. 27, 2008, in the Japanese Patent Office, the disclosures of which are incorporated herein by reference.

BACKGROUND OF THE INVENTION

1. Field of the Invention

Aspects of the present invention relate to a process for producing a semiconductive porcelain composition/electrode assembly having a positive resistance temperature, which is used in a PTC thermistor, a PTC heater, a PTC switch, a temperature detector and the like.

2. Description of the Related Art

Compositions comprising BaTiO3 having added thereto various semiconductor dopants have conventionally been proposed as materials showing a PTCR characteristics (Positive Temperature Coefficient of Resistivity). Those compositions have a Curie temperature around 120° C. It is required for those compositions to shift the Curie temperature, depending on the use.

For example, it is proposed to shift the Curie temperature by adding $SrTiO_3$ to $BaTiO_3$. In this case, however, the Curie temperature shifts to only a negative direction, and does not shift to a positive direction. Currently, only $PbTiO_3$ has been known as an additive element for shifting the Curie temperature to a positive direction. However, $PbTiO_3$ contains an element that causes environmental pollution. Therefore, a material free of use of $PbTiO_3$ has been demanded in recent years.

Great characteristic of the PTC materials is that the resistivity of a PTC material suddenly rises at a Curie point (jump characteristic=temperature coefficient of resistance α). This is considered for the reason that resistance (resistance by Schottky barrier) formed in a crystal grain boundary is increased. PTC materials are required to have high jump characteristic of the resistivity as their properties.

The Pb-free PTC materials as described in Patent Document 1 have such tendency that the materials having excellent jump characteristic have high room temperature resistivity, and the materials having poor jump characteristic have too low room temperature resistivity, so that there was a problem that the materials cannot satisfy both stable room temperature resistivity and excellent jump characteristic.

To overcome the above and/or other problems of the conventional $BaTiO_3$ semiconductor ceramic, the present inventors previously proposed a semiconductive porcelain composition in which a part of Ba of $BaTiO_3$ is substituted with Bi—Na and which have a P-type semiconductive component at a crystal grain boundary, which is a semiconductive porcelain composition having a composition formula represented by $[(BiNa)_x(Ba_{1-y}R_y)_{1-x}]TiO_3$ (R is at least one of rare earth elements) in which x and y satisfy $0<x\leq0.3$ and $0<y\leq0.02$ or a semiconductive porcelain composition having a composition formula represented by $[(BiNa)_xBa_{1-x}][Ti_{1-z}M_z]O_3$ (M is at least one of Nb and Sb) in which x and z satisfy $0<x\leq0.3$ and $0<z\leq0.005$, as a material in which a part of $BaTiO_3$ is substituted with Bi—Na and which can shift a Curie temperature to a positive direction and shows excellent jump characteristic while greatly decreasing room temperature resistivity, without using Pb (Patent Document 2).

These semiconductive porcelain compositions shift a Curie temperature to a positive direction without using Pb and show excellent jump characteristic while greatly decreasing room temperature resistivity, but had a problem of change with the passage of time such that when used as a heater material, electric resistivity of the material changes. It has been known that when oxygen content in these $BaTiO_3$ semiconductive porcelain compositions changes, a carrier concentration is changed, whereby electric resistivity is changed. Because the above-mentioned materials are sintered in an inert gas atmosphere, the materials are sintered in a state of deficient oxygen. Therefore, when the materials are used in the air, deficient amount of oxygen changes, and resistivity is liable to change. In particular, when energization is conducted in a state that an electrode is joined as a heater material, transfer of oxygen occurs among oxygen in the air and between a semiconductive porcelain composition and an electrode when the material has high temperature of from 50° C. to 120° C., whereby room temperature resistivity is changed.

Patent Document 1: JP-A-56-169301
Patent Document 2: Japanese Patent Application No. 2007-333528

SUMMARY OF THE INVENTION

An aspect of the present invention is to provide a semiconductive porcelain composition/electrode assembly having low room temperature resistivity of 100 Ω·cm or less and decreased change with the passage of time by enagization with regard to the semiconductive porcelain composition in which a part of Ba of $BaTiO_3$ is substituted with Bi—Na and which has P-type semiconductive component at a crystal grain boundary.

A first aspect to solve the above and/or other problems is a process for producing a semiconductive porcelain composition/electrode assembly wherein an electrode is joined to a semiconductive porcelain composition in which a part of Ba of $BaTiO_3$ is substituted with Bi—Na and which has a P-type semiconductive component at a crystal grain boundary, the process comprising joining the electrode to the semiconductive porcelain composition, followed by conducting a heat treatment at a temperature of from 100° C. to 600° C. for 0.5 hour to 24 hours. By conducting the heat treatment in a state that the electrode is joined, it previously brings close to chemical equilibrium state of oxygen between a semiconductive porcelain composition and the air and between a semiconductive porcelain composition and an electrode in the case that an element has high temperature at the time of energization, and transfer of oxygen hardly occurs to a semiconductive porcelain composition even when a sample has high temperature of from 50 to 120° C. at the time of energization, so that room temperature resistivity change can be suppressed. The heat treatment may be conducted in the air or may be conducted in oxygen. When the heat treatment is conducted before joining an electrode, it brings close to chemical equilibrium state of oxygen between a semiconductive porcelain composition and the atmosphere, but transfer of oxygen between an electrode and a semiconductive porcelain composition occurs even after joining an electrode. As a result, the effect of decreasing room temperature resistivity change is small. Furthermore, in the case that heat treatment temperature is lower than 100° C., it cannot make chemical equilibrium state of oxygen, whereas in the case that heat treatment is conducted at a temperature higher than 600° C., a semiconductive porcelain composition modifies due to the high temperature, room temperature resistivity becomes 100 Ω·cm or more, and it thus becomes difficult to apply the composition to a PTC heater and the like, both of which are therefore not preferred. Furthermore, when the heat treatment time is shorter than 0.5 hour, it cannot bring close to chemical equilibrium state of oxygen, whereas when the heat treatment time exceeds 24 hours, production cost becomes too expensive, both of which are therefore not preferred.

Preferably, the semiconductive porcelain composition has a composition formula represented by $[(BiNa)_x(Ba_{1-y}R_y)_{1-x}]TiO_3$ (in which R is at least one of rare earth elements) in which x and y satisfy $0<x\leq0.3$ and $0<y\leq0.02$. Symbol x indicates a component range of (BiNa). When x is 0, a Curie temperature cannot be shifted to a high temperature side, whereas when x exceeds 0.3, room temperature resistivity approaches 102 Ω·cm and it thus becomes difficult to apply the composition to a PTC heater and the like, both of which are therefore not preferred.

R is at least one of rare earth elements, and is most preferably La. In the composition formula, y indicates a component range of R. When y is 0, the composition does not become conductive, whereas when y exceeds 0.02, room temperature resistivity is increased, both of which are therefore not preferred. When x and y are within the above-mentioned ranges, a semiconductive porcelain composition having smaller room temperature resistivity and excellent jump characteristic can be obtained. When the semiconductive porcelain composition having an electrode joined thereto is heat-treated at a temperature of from 100° C. to 600° C. for 0.5 hour to 24 hours, a semiconductive porcelain composition/electrode assembly having excellent change with the passage of time, low room temperature resistance of 100 Ω·cm or less, and excellent jump characteristic can be obtained.

Furthermore, the semiconductive porcelain composition of claim 1 preferably has a composition formula represented by $[(BiNa)_xBa_{1-x}][Ti_{1-z}M_z]O_3$ (in which M is at least one of Nb and Sb) in which x and z satisfy $0<x\leq0.3$ and $0<z\leq0.005$. Symbol x indicates a component range of (BiNa). When x is 0, a Curie temperature cannot be shifted to a high temperature side, whereas when x exceeds 0.3, room temperature resistivity approaches 102 Ω·cm and it becomes difficult to apply the composition to a PTC heater and the like, both of which are therefore not preferred.

M is at least one of Nb and Sb, and is preferably Nb. In the composition formula, z indicates a component range of M. When z is 0, valence control cannot be made and the composition does not become conductive, whereas when z exceeds 0.005, room temperature resistivity exceeds 103 Ω·cm, both of which are therefore not preferred. When x and z are within the above-mentioned ranges, a semiconductive porcelain composition having smaller room temperature resistivity and excellent jump characteristic can be obtained. When the semiconductive porcelain composition having an electrode joined thereto is heat-treated at a temperature of from 100° C. to 600° C. for 0.5 hour to 24 hours, a semiconductive porcelain composition/electrode assembly having excellent change with the passage of time, low room temperature resistance of 100 Ω·cm or less, and excellent jump characteristic can be obtained.

According to aspects of the present invention, there may be provided a semiconductive porcelain composition/electrode assembly in which change with the passage of time by energization of 13V for 5,000 hours is suppressed low as 10% or less while maintaining room temperature resistivity low as 100 Ω·cm or less without using Pb.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
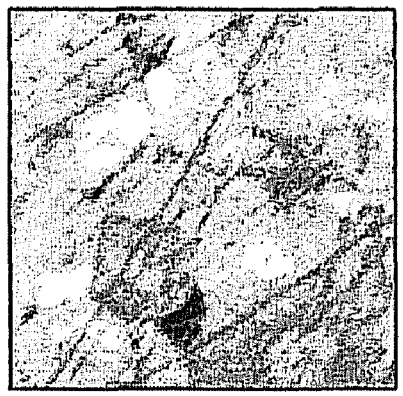
FIG. 1 is a view showing a structure photograph of an observation image by a scanning capacitance microscope of a semiconductive porcelain composition of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Although the semiconductive porcelain composition according to the present invention can be any composition so long as it contains a composition in which a part of Ba of $BaTiO_3$ is substituted with Bi—Na, preferred is a composition having a composition formula represented by $[(BiNa)_x(Ba_{1-y}R_y)_{1-x}]TiO_3$ (in which R is at least one of rare earth elements) in which x and y satisfy $0<x\leq0.3$ and $0<y\leq0.02$, or a composition having a composition formula represented by $[(BiNa)_xBa_{1-x}][Ti_{1-z}M_z]O_3$ (in which M is at least one of Nb and Sb) in which x and z satisfy $0<x\leq0.3$ and $0<z\leq0.005$. The present invention is specifically described below by reference to the Examples, but the invention is not construed as being limited to those Examples.

The characteristic of the present invention is that P-type semiconductive component is present at a crystal grain boundary in the semiconductive porcelain composition in which a part of Ba of $BaTiO_3$ is substituted with Bi—Na.

Figure 2:
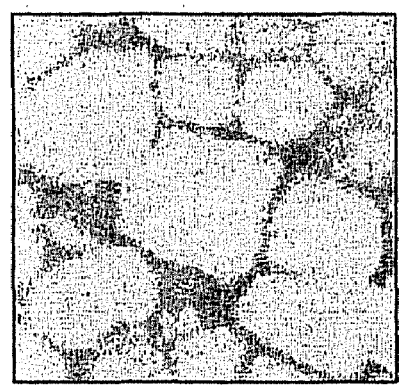
FIG. 2 is a view showing a structure photograph of an observation image by a scanning capacitance microscope of a semiconductive porcelain composition of the present invention.
Figure 3:
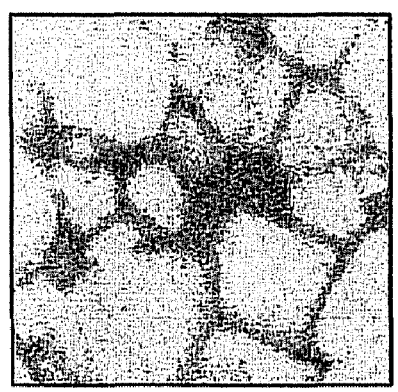
FIG. 3 is a view showing a structure photograph of an observation image by a scanning capacitance microscope of a semiconductive porcelain composition of the present invention.
Figure 4:
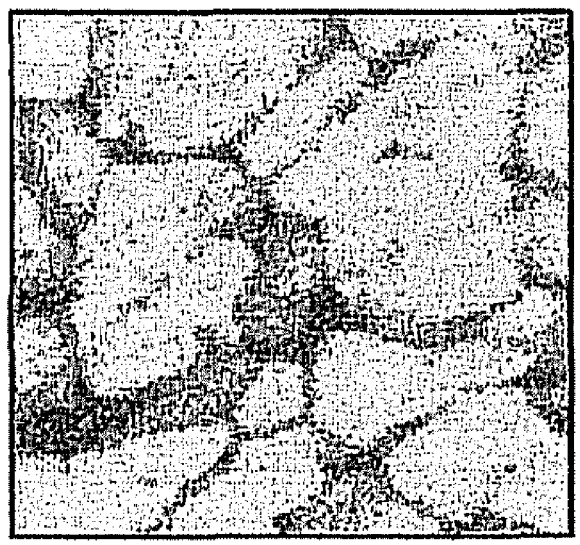
FIG. 4 is a view showing a structure photograph of an observation image by a scanning capacitance microscope of a semiconductive porcelain composition of the present invention.
Figure 5:
FIG. 5 is a view showing a structure photograph of an observation image by a scanning capacitance microscope of a semiconductive porcelain composition of the present invention.

The presence of P-type semiconductive component can be confirmed by, for example, observing an arbitrary face of the semiconductive porcelain composition with a scanning capacitance microscope. FIGS. 1 to 5 are views showing structure photographs obtained by observing an arbitrary face of the semiconductive porcelain composition of the present invention with a scanning capacitance microscope. In each drawing, parts shown in white are main crystal of the present composition, parts shown in gray are crystal grain boundaries, and parts shown in black than gray are P-type semiconductive component. As is apparent from FIGS. 1 to 5, P-type semiconductive component is present at the crystal grain boundary.

One embodiment of a production process for obtaining the semiconductive porcelain composition of the present invention is described below.

In the present invention, in producing a semiconductive porcelain composition in which a part of Ba of $BaTiO_3$ is substituted with Bi—Na, there is applied a separate calcination method in which a calcined BT powder composed of a calcined powder of $(BaR)TiO_3$ (in the case that the semiconductive porcelain composition has a composition formula of $[(BiNa)_x(Ba_{1-y}R_y)_{1-x}]TiO_3)$ or a calcined powder of $Ba(TiM)O_3$ (in the case that the semiconductive porcelain composition has a composition formula of $[(BiNa)_x(Ba_{1-x}][Ti_{1-z}M_z]O_3)$, and a calcined BNT powder composed of a calcined powder of $(BiNa)TiO_3$ are separately prepared, and the calcined BT powder and the calcined BNT powder are calcined at the respective suitable temperatures for those powders.

When the above-described separate calcination method is used, volatilization of Bi in the calcined BNT powder can be suppressed, and generation of a different phase can be suppressed through prevention of a compositional deviation of Bi—Na. Therefore, when those powders are mixed, followed by shaping and sintering, a semiconductive porcelain composition which is low in room temperature resistivity and in which fluctuation of Curie temperature is suppressed may be obtained.

The following three methods can be employed to obtain the semiconductive porcelain composition of the present invention by using the above-described separate calcination method. That is, (1) a method in which the calcined BT powder is prepared by the separate calcination method such that a part of $BaCO_3$ and $TiO_2$ remains in the calcined BT powder (hereinafter referred to as a "residual method"); (2) a method in which $BaCO_3$ and/or $TiO_2$ is/are added to the calcined BT powder and/or the calcined BNT powder prepared by the separate calcination method (hereinafter referred to as an "addition method"); and (3) a method in which BT and BNT are sintered without being completely solid-solubilized when sintering the calcined BT powder and the calcined BNT powder prepared by the separate calcination method (hereinafter referred to as an "incomplete sintering method"). The above methods are described below in the order.

(1) Residual Method

In the separate calcination method, the calcined BT powder is prepared by mixing $BaCO_3$, $TiO_2$ and a raw material powder of a semiconductor dopant, such as $La_2O_3$ or $Nb_2O_5$, to prepare a mixed raw material powder, followed by calcination. Hitherto, the calcination has been carried out at a temperature in a range of from 900° C. to 1300° C. in order to form a complete single phase. On the other hand, the residual method is such that the calcination is carried out at a temperature of 900° C. or lower which is lower than the conventional calcination temperature, so that a part of $BaCO_3$ and $TiO_2$ remains in the calcined powder without completely forming $(BaR)TiO_3$ or $Ba(TiM)O_3$.

When the calcined BT powder having a part of $BaCO_3$ and $TiO_2$ remaining therein prepared by the residual method and the calcined BNT powder separately prepared are mixed, and the resulting mixed calcined powder is shaped and sintered, a semiconductive porcelain composition of the present invention in which a part of Ba is substituted with Bi—Na and which has a P-type semiconductive component is at the crystal grain boundary can be obtained.

The residual amount of $BaCO_3$ and $TiO_2$ in the calcined BT powder can be changed by changing the calcination temperature at 900° C. or lower, changing the calcination time or changing a blending composition of the calcined BT powder, in the step of preparing the calcined BT powder, whereby the existence ratio of P-type semiconductive component may be controlled.

In the above-described residual method, when the calcination temperature exceeds 900° C., $(BaR)TiO_3$ or $Ba(TiM)O_3$ is excessively formed, and $BaCO_3$ and $TiO_2$ cannot remain, which is not preferred. The calcination time is preferably from 0.5 hours to 10 hours, and more preferably from 2 to 6 hours.

The residual amount of $BaCO_3$ and $TiO_2$ in the calcined BT powder is preferably such that the amount of $BaCO_3$ is 30 mol % or less and the amount of $TiO_2$ is 30 mol % or less when the sum of $(BaR)TiO_3$ or $Ba(TiM)O_3$, $BaCO_3$ and $TiO_2$ is regarded as 100 mol %.

The reason that the residual amount of $BaCO_3$ is 30 mol % or less is that when the amount exceeds 30 mol %, a different phase other than $BaCO_3$ is formed, and the room temperature resistivity is increased. Furthermore, $CO_2$ gas generates in the sintering step, and cracks are generated in a sintered body, which is not preferred. The reason that the residual amount of $TiO_2$ is 30 mol % or less is that when the amount exceeds 30 mol %, a different phase other than $BaCO_3$ is formed, and the room temperature resistivity is increased.

The upper limit of the residual amount of $BaCO_3$ and $TiO_2$ is the total 60 mol % of $BaCO_3$ 30 mol % and $TiO_2$ 30 mol %, and the lower limit thereof is an amount exceeding 0. In the case that $BaCO_3$ exceeds 20 mol %, when $TiO_2$ is less than 10 mol %, a different phase other than $BaCO_3$ is formed and room temperature resistivity is increased, which is not preferred. The case that $TiO_2$ exceeds 20 mol % and $BaCO_3$ is less than 10 mol % is also not preferred for similar reason. Therefore, in the case that one of $BaCO_3$ and $TiO_2$ exceeds 20 mol %, calcination temperature, temperature, blending composition and the like are preferably adjusted such that the other is 10 mol % or more.

In the above-described step of preparing the calcined BNT powder composed of the calcined powder of $(BiNa)TiO_3$ to be mixed with the calcined BT powder in which a part of $BaCO_3$ and $TiO_2$ remains therein, a mixed raw material powder is firstly prepared by mixing $Na_2CO_3$, $Bi_2O_3$ and $TiO_2$ as raw material powders. In this case, when $Bi_2O_3$ is excessively added (for example, exceeding 5 mol %), a different phase is formed at the time of the calcination, and room temperature resistivity is increased, which is not preferred.

Next, the mixed raw material powder is calcined. The calcination temperature is preferably a range of from 700° C. to 950° C. The calcination time is preferably from 0.5 hours to 10 hours, and more preferably from 2 hours to 6 hours. When the calcination temperature is lower than 700° C. or the calcination time is shorter than 0.5 hours, unreacted $Na_2CO_3$ or NaO formed through decomposition react with water in the air or a solvent in the case of wet mixing, resulting in causing compositional deviation or characteristic fluctuation, which is not preferred. On the other hand, when the calcination temperature exceeds 950° C. or the calcination time exceeds 10 hours, Bi greatly volatilizes, resulting in causing compositional deviation and promoting formation of a different phase, which is not preferred.

In the steps of preparing the above-described respective calcined powders, the raw material powders may be crushed depending on the grain size thereof in mixing the raw material powders. Mixing and crushing may be any of wet mixing and crushing using pure water or ethanol, and dry mixing and crushing. However, when drying mixing and crushing are conducted, compositional deviation can further be prevented, which is preferred. In the above, $BaCO_3$, $Na_2CO_3$, $TiO_2$ and the like are exemplified as the raw material powders. However, other Ba compounds, Na compounds and the like may be used.

As described above, the calcined BT powder in which a part of $BaCO_3$ and $TiO_2$ remains therein and the calcined BNT powder are separately prepared, and the respective calcined powders are blended in given amounts, followed by mixing. The mixing may be any of wet mixing using pure water or ethanol, and dry mixing. When dry mixing is conducted, compositional deviation can further be prevented, which is preferred. Furthermore, crushing after mixing may be conducted, or mixing and crushing may simultaneously be conducted, depending on the grain size of the calcined powders. The average grain size of the mixed calcined powder after mixing and crushing is preferably from 0.5 μm to 2.5 μm.

In the step of preparing the calcined BT power and/or the step of preparing the calcined BNT power, or in the step of mixing the respective calcined powders described above, when Si oxide is added in an amount of 3.0 mol % or less or Ca oxide or Ca carbonate is added in an amount of 4.0 mol % or less, the Si oxide can suppress the abnormal growth of crystal grains and additionally can facilitate to control resistivity, and the Ca oxide or the Ca carbonate can improve sinterability at low temperature and can control reducibility, which are preferred. When either one of them is added in an amount exceeding the above-described limit, the composition does not show semiconductivity, which is not preferred. The addition is preferably conducted before mixing in each step.

The mixed calcined powder obtained in the step of mixing the calcined BT powder and the calcined BNT powder is shaped by a desired shaping means. If necessary, the crushed powder may be granulated with a granulator before shaping. The resulting compact after shaping preferably has a density of from 2.5 to 3.5 $g/cm^3$.

The sintering can be conducted in the air, in a reduced atmosphere or in an inert gas atmosphere having low oxygen concentration. The sintering is particularly preferably conducted in a nitrogen or argon atmosphere having an oxygen concentration of less than 1%. The sintering temperature is preferably from 1250° C. to 1380° C. The sintering time is preferably from 1 hour to 10 hours, and more preferably from 2 hours to 6 hours. With deviating from the preferred conditions of those, room temperature resistivity is increased and jump characteristic is decreased, which are not preferred.

Another sintering step is that in an atmosphere in which a temperature is from 1290° C. to 1380° C. and an oxygen concentration is less than 1%, (1) sintering is performed in a sintering time shorter than 4 hours, or (2) sintering is performed in a sintering time satisfying the formula: $\Delta T \geq 25t$ (in which t is sintering time (hr), and $\Delta T$ is cooling rate (° C./hr) after sintering), and cooling after sintering is then performed at a cooling rate satisfying the above formula. This sintering step enables to obtain a semiconductive porcelain composition having improved temperature coefficient of resistance at a high temperature region (Curie temperature or higher) while maintaining room temperature resistivity low.

(2) Addition Method

In the addition method, the calcined BT powder is prepared by mixing $BaCO_3$, $TiO_2$ and a raw material powder of a semiconductor dopant, such as $La_2O_3$ or $Nb_2O_5$, to prepare a mixed raw material powder, followed by calcination. The calcination temperature is preferably 1000° C. or higher. When the calcination temperature is lower than 1000° C., a complete single phase of $(BaR)TiO_3$ or $Ba(TiM)O_3$ is not formed, which is not preferred. This is because unreacted $BaCO_3$ and $TiO_2$ remain when a complete single phase is not formed, and since the present invention is based on the assumption that a $BaCO_3$ powder and/or a $TiO_2$ powder is/are added, it is thus difficult to estimate the addition amount. However, minor remainders of $BaCO_3$ and $TiO_2$ may be allowed. The calcination temperature is preferably from 1000° C. to 1300° C. The calcination time is preferably from 0.5 hours to 10 hours, and more preferably from 2 to 6 hours.

In the addition method, the step of preparing the calcined BNT powder, the step of mixing (crushing) the calcined BT powder and the calcined BNT powder, and the like are the same as in the above-described residual method.

The feature of the addition method is that $BaCO_3$ and/or $TiO_2$ is/are added to the calcined BT powder, the calcined BNT powder or the mixed calcined powder thereof, prepared above. When the mixed calcined powder after the addition is shaped and sintered, a semiconductive porcelain composition of the present invention in which a part of Ba of $BaTiO_3$ is substituted with Bi—Na and which has a P-type semiconductive component at the crystal grain boundary can be obtained.

The addition amount of $BaCO_3$ and/or $TiO_2$ is preferably such that $BaCO_3$ is 30 mol % or less and $TiO_2$ is 30 mol % or less when the total of $(BaR)TiO_3$ or $Ba(TiM)O_3$, and $BaCO_3$ and/or $TiO_2$ is regarded as 100 mol %. By changing the addition amount, the existence ratio of the P-type semiconductive component may be controlled. In particular, since the addition method can accurately adjust the addition amount, it also has an effect that it is possible to control the room temperature resistivity extremely accurately.

The reason that the amount of $BaCO_3$ added is 30 mol % or less is that when the amount exceeds 30 mol %, a different phase other than $BaCO_3$ is formed and the room temperature resistivity is increased. Furthermore, $CO_2$ gas generates in the sintering step, and cracks cause in the sintered body, which is not preferred. The reason that the amount of $TiO_2$ added is 30 mol % or less is that when the amount exceeds 30 mol %, a different phase other than $BaCO_3$ is formed and the room temperature resistivity is increased.

When both $BaCO_3$ and $TiO_2$ are contained, the upper limit of the addition amount is the total 60 mol % of $BaCO_3$ 30 mol % and $TiO_2$ 30 mol %, and the lower limit is the amount exceeding 0. In the case that $BaCO_3$ exceeds 20 mol %, when $TiO_2$ is less than 10 mol %, a different phase other than $BaCO_3$ is formed and the room temperature resistivity is increased, which is not preferred. The case that $TiO_2$ exceeds 20 mol % and $BaCO_3$ is less than 10 mol % is also not preferred for similar reason. Therefore, in the case that one of $BaCO_3$ and $TiO_2$ exceeds 20 mol %, the other is preferably 10 mol % or more.

Incidentally, the calcined BT powder is preferably such that a complete single phase of $(BaR)TiO_3$ or $Ba(TiM)O_3$ is formed therein, as described before. In this regard, the addition amount may be changed by substituting a part of the calcined BT powder having a complete single phase formed therein with the calcined BT powder in which $BaCO_3$ and $TiO_2$ remain obtained by the above-described residual method and further adding a given amount of $BaCO_3$ and/or $TiO_2$.

In the addition method, after the calcined BT powder and the calcined BNT powder are separately prepared, $BaCO_3$ and/or $TiO_2$ is/are added to the calcined BT powder, the calcined BNT powder or the mixed calcined powder thereof, as described above. Given amounts of the respective calcined powders are blended, followed by mixing. The mixing may be any of wet drying using pure water or ethanol, or dry drying.

Dry mixing is preferable since it can prevent compositional deviation. Depending on the grain size of the calcined powder, crushing may be conducted after mixing, or mixing and crushing may simultaneously be conducted. The mixed calcined powder after mixing and crushing has an average grain size of preferably from 0.5 µm to 2.5 µm.

In the step of preparing the calcined BT power and/or the step of preparing the calcined BNT power, or in the step of mixing the those calcined powders, described above, when Si oxide is added in an amount of 3.0 mol % or less or Ca oxide or Ca carbonate is added in an amount of 4.0 mol % or less, the Si oxide can suppress the abnormal growth of crystal grains and can facilitate to control resistivity, and the Ca oxide or the Ca carbonate can improve sinterability at low temperature and can control reducibility, which are preferred. When either one of them is added in an amount exceeding the above-described limit, the composition does not show semiconductivity, which is not preferred. The addition is preferably conducted before mixing in each step.

Subsequent steps of shaping, sintering and the like after the step of mixing the calcined BT powder and the calcined BNT powder are the same as in the above-described residual method.

(3) Incomplete Sintering Method

In the incomplete sintering method, the step of preparing the calcined BT powder, the step of preparing the calcined BNT powder, the step of mixing (crushing) the calcined BT powder and the calcined BNT powder, and the shaping step are the same as in the above-described addition method.

The feature of the incomplete sintering method is that in sintering the mixed calcined powder of the calcined BT powder and the calcined BNT powder, the mixed calcined powder is sintered without completely solid-solubilizing BT and BNT. Consequently, there may be obtained a semiconductive porcelain composition of the present invention in which a part of Ba of $BaTiO_3$ is substituted with Bi—Na and which has a P-type semiconductive component at the crystal grain boundary.

The sintering temperature and sintering time in the incomplete sintering method vary depending on the calcination temperature of the calcined BT powder. For example, in the case that the calcination temperature of the calcined BT powder is from 700° C. to 1200° C., the sintering temperature is preferably a range of from 1250° C. to 1380° C., and the sintering time is preferably a range of 2.5 hours or less. However, the preferred sintering time in the case that the sintering temperature is relatively low (for example, the case of 1300° C.) may be 3.5 hours or less, and the preferred sintering time in the case that the sintering temperature is relatively high (for example, the case of 1380° C.) is 2 hours or less. The case that the sintering temperature is high (for example, the case of 1400° C.) and the case that the sintering temperature is low but the sintering time is long (for example, the case of 5 hours or more) are not preferred for the reason that BT and BNT may completely be solid-solubilized.

The degree of solid solubilization of BT and BNT can be changed by controlling the sintering temperature and the sintering time, as described above, whereby the existence ratio of the P-type semiconductive component may be controlled.

EXAMPLES

Example 1

A semiconductive porcelain composition was obtained as follows using a residual method. Raw material powders of $BaCO_3$, $TiO_2$ and $La_2O_3$ were prepared and blended so as to be $(Ba_{0.994}La_{0.006})TiO_3$, followed by mixing in pure water. The mixed raw material powder obtained was calcined at 900° C. for 4 hours in the air to prepare a calcined BT powder.

Raw material powders of $Na_2CO_3$, $Bi_2O_3$ and $TiO_2$ were prepared and blended so as to be $(Bi_{0.5}Na_{0.5})TiO_3$, followed by mixing in ethanol. The mixed raw material powder obtained was calcined at 900° C. for 2 hours in the air to prepare a calcined BNT powder.

The calcined BT powder and the calcined BNT powder prepared above were blended so as to be 73/7 in molar ratio. The resultant was mixed and pulverized by a pot mill using pure water as a medium until a central grain size of the mixed calcined powder is from 1.0 µm to 2.0 µm, followed by drying. PVA was added to a pulverized powder of the mixed calcined powder, followed by mixing, and the resulting mixture was granulated with a granulator. The granulated powder thus obtained was shaped with a uniaxial pressing machine, and the resulting shaped body was subjected to binder removal at 700° C., and then sintered at 1,360° C. for 4 hours in nitrogen to obtain a sintered body.

The sintered body obtained was processed into a plate having a size of 10 mm×10 mm×1 mm to prepare a test piece, an ohmic electrode (model number: SR5051) manufactured by Namics Corporation was applied, and a covering electrode (model number: SR5080) manufactured by Namics Corporation was further applied, followed by drying at 180° C. and subsequent baking at 600° C. for 10 min, thereby forming an electrode. Thereafter, heat treatment was conducted at 100° C. for 0.5 hour in the air to obtain a semiconductive porcelain composition/electrode assembly. Electric resistivity at 25° C. of the semiconductive porcelain composition was measured. The assembly was then incorporated in a heater with an aluminum fin, and energization test with 13V for 5,000 hours was conducted while cooling with wind speed of 4 m/s. Temperature of the fin at this time was 70° C. Electric resistivity at 25° C. after the energization test was measured, and by comparing with that before energization test, resistance change rate was obtained, and change with the passage of time was examined. The results obtained are shown in Table 1. Room temperature resistivity after heat treatment was 50 Ω·cm, room temperature resistivity after energization for 5,000 hours was 54.5 Ω·cm, and resistance change rate was 9%.

Examples 2 to 12 are examples where heat treatment temperature and heat treatment time were changed. Production process and evaluation method of semiconductive porcelain composition/electrode assemblies were the same as those in Example 1. The results obtained are shown in Table 1.

Examples 13 to 17 are examples where a molar ratio between the calcined BT powder and the calcined BNT powder was changed. Production process and evaluation method of semiconductive porcelain composition/electrode assemblies were the same as those in Example 1. The results obtained are shown in Table 1.

Example 18 is an example where a part of Ti was substituted with Nb.

Example 18

Raw material powders of $BaCO_3$, $TiO_2$ and $Nb_2O_3$ were prepared and blended so as to be $Ba(Ti_{0.997}Nb_{0.003})O_3$, followed by mixing in pure water. The mixed raw material powder obtained was calcined at 900° C. for 4 hours in the air to prepare a calcined BT powder.

Raw material powders of $Na_2CO_3$, $Bi_2O_3$ and $TiO_2$ were prepared and blended so as to be $(Bi_{0.5}Na_{0.5})TiO_3$, followed by mixing in ethanol. The mixed raw material powder obtained was calcined at 900° C. for 2 hours in the air to prepare a calcined BNT powder.

The calcined BT powder and the calcined BNT powder, prepared above were blended so as to be 73/7 in molar ratio. The resulting mixture was mixed and pulverized by a pot mill using pure water as a medium until a central grain size of the mixed calcined powder is from 1.0 µm to 2.0 µm, followed by drying. PVA was added to a pulverized powder of the mixed calcined powder, followed by mixing, and the resulting mixture was granulated with a granulator. The granulated powder thus obtained was shaped with a uniaxial pressing machine, and the resulting shaped body was subjected to binder removal at 700° C., and then sintered at 1,360° C. for 4 hours in nitrogen to obtain a sintered body. An electrode was formed on the obtained sintered body in the same manner as in Example 1, and heat treatment was conducted at 300° C. for 3 hours in the air to obtain a semiconductive porcelain composition/electrode assembly. The evaluation method was the same as that in Example 1. The results obtained are shown in Table 1.

Examples 19 to 23 are examples where a part of Ti was substituted with Nb, and heat treatment conditions were changed. Production process and evaluation method of semiconductive porcelain composition/electrode assemblies were the same as those in Example 18. The results obtained are shown in Table 1.

Example 24 is an example where a part of Ti was substituted with Sb. A sample was prepared and characteristic evaluation was made in the same manner as Example 18 except that $Sb_2O_3$ was used in place of $Nb_2O_3$. The results obtained are shown in Table 1.

Comparative Example 1 is an example where heat treatment was not conducted after formation of an electrode. A sample was prepared and characteristic evaluation was made in the same manner as Example 1 except that heat treatment was not conducted. The results obtained are shown in Table 1.

Comparative Examples 2 to 5 are examples where heat treatment conditions were outside the scope of the present invention. A sample was prepared and characteristic evaluation was made in the same manner as the Examples except for the heat treatment conditions. The results obtained are shown in Table 1.

Comparative Example 6 is an example where heat treatment was conducted before joining an electrode.

Comparative Example 6

A semiconductive porcelain composition was sintered in the same manner as Example 1, and heat treatment was then conducted at 300° C. for 3 hours. Thereafter, an electrode was formed in the same manner as Example 1, and characteristic evaluation was made. The results obtained are shown in Table 1.

TABLE 1

| | x | y (z) | Heat treatment temperature (° C.) | Heat treatment time (hr) | $R_{25}$ ($\Omega \cdot cm$) | Resistance change rate (%) |
|---|---|---|---|---|---|---|
| Example 1 | 0.088 | 0.006 | 100 | 0.5 | 50 | 9 |
| Example 2 | 0.088 | 0.006 | 100 | 3 | 53 | 8.5 |
| Example 3 | 0.088 | 0.006 | 100 | 10 | 55 | 8.4 |
| Example 4 | 0.088 | 0.006 | 100 | 24 | 65 | 8.2 |
| Example 5 | 0.088 | 0.006 | 300 | 0.5 | 55 | 7.1 |
| Example 6 | 0.088 | 0.006 | 300 | 3 | 59 | 6.5 |
| Example 7 | 0.088 | 0.006 | 300 | 10 | 63 | 5.8 |
| Example 8 | 0.088 | 0.006 | 300 | 24 | 71 | 5.2 |
| Example 9 | 0.088 | 0.006 | 600 | 0.5 | 65 | 6.5 |
| Example 10 | 0.088 | 0.006 | 600 | 3 | 72 | 5.1 |
| Example 11 | 0.088 | 0.006 | 600 | 10 | 78 | 4.6 |
| Example 12 | 0.088 | 0.006 | 600 | 24 | 85 | 4.1 |
| Example 13 | 0.28 | 0.006 | 300 | 3 | 85 | 7.1 |
| Example 14 | 0.14 | 0.006 | 300 | 3 | 73 | 7.3 |
| Example 15 | 0.02 | 0.006 | 300 | 3 | 55 | 7.6 |
| Example 16 | 0.088 | 0.018 | 300 | 3 | 50 | 6.8 |
| Example 17 | 0.088 | 0.002 | 300 | 3 | 89 | 8.8 |
| Example 18 | 0.088 | 0.003 | 300 | 3 | 73 | 8.2 |
| Example 19 | 0.088 | 0.003 | 300 | 0.5 | 68 | 8.9 |
| Example 20 | 0.088 | 0.003 | 300 | 10 | 76 | 7.8 |
| Example 21 | 0.088 | 0.003 | 300 | 24 | 81 | 7.5 |
| Example 22 | 0.088 | 0.003 | 100 | 3 | 70 | 9.4 |
| Example 23 | 0.088 | 0.003 | 600 | 3 | 85 | 7.1 |
| Example 24 | 0.088 | 0.003 | 300 | 3 | 75 | 8.4 |
| Comparative Example 1 | 0.088 | 0.006 | — | — | 45 | 18.5 |
| Comparative Example 2 | 0.088 | 0.006 | 90 | 3 | 48 | 13.2 |
| Comparative Example 3 | 0.088 | 0.006 | 650 | 3 | 118 | 7.1 |
| Comparative Example 4 | 0.088 | 0.006 | 300 | 0.3 | 51 | 14.7 |
| Comparative Example 5 | 0.088 | 0.006 | 300 | 27 | 75 | 5.1 |
| Comparative Example 6 | 0.088 | 0.006 | 300 | 3 | 59 | 11.5 |

It is seen from Table 1 that according to the Examples of the present invention, a semiconductive porcelain composition/electrode assembly in which room temperature resistivity is low as 100 Ω·cm or less, and change with the passage of time after energization with 13V for 5,000 hours is suppressed low as 10% or less is obtained even in any constitution. Furthermore, it is seen from Example 1 and Comparative Example 2 that unless the heat treatment temperature is 100° C. or higher, change with the passage of time after a energization test of 5,000 hours is not suppressed to 10% or less, and from Example 10 and Comparative Example 3 that when the heat treatment temperature is higher than 600° C., room temperature resistivity is too high as 100 Ω·cm or more. Furthermore, it is seen from the comparison between Examples 5 to 8 and Comparative Example 4 that the sufficient heat treatment time is 0.5 hour or longer. However, where the heat treatment time exceeds 24 hours, production cost is too expensive, which is not preferred. Furthermore, it is seen from Comparative Example 6 that even though the heat treatment is conducted before joining an electrode, the effect of suppressing change with the passage of time is small.

Semiconductive porcelain compositions after heat treatment obtained in all the Examples and Comparative Examples have P-type semiconductive component at crystal grain boundary, and area concentration thereof was within a range of from 0.01 to 10%.

Although the present invention has been described in detail and by reference to the specific embodiments, it is apparent to one skilled in the art that various modifications or changes can be made without departing the spirit and scope of the present invention.

The semiconductive porcelain composition/electrode assembly obtained according to aspects of the present invention is optimal as a material for a PTC thermistor, a PTC heater, a PTC switch, a temperature detector, and the like.

The invention claimed is:

1. A process for producing a semiconductive porcelain composition/electrode assembly wherein an electrode is joined to a semiconductive porcelain composition in which a part of Ba of $BaTiO_3$ is substituted with Bi-Na and which has a P-type semiconductive component at a crystal grain boundary, the process comprising joining the electrode to the semiconductive porcelain composition, followed by conducting a heat treatment at a temperature of from 100° C. to 600° C. for 0.5 hour to 24 hours.

2. The process for producing a semiconductive porcelain composition/electrode assembly as claimed in claim 1, wherein the semiconductive porcelain composition has a composition formula represented by $[(BiNa)_x(Ba_{1-y}R_y)_{1-x}]TiO_3$ (wherein R is at least one of rare earth elements) wherein x and y satisfy $0<x\leq0.3$ and $0<y\leq0.02$.

3. The process for producing a semiconductive porcelain composition/electrode assembly as claimed in claim 1, wherein the semiconductive porcelain composition has a composition formula represented by $[(BiNa)Ba_xBa_{1-x}][Ti_{1-z}M_z]O_3$ (wherein M is at least one of Nb and Sb) wherein x and z satisfy $0<x\leq0.3$ and $0<z\leq0.005$.

* * * * *